United States Patent [19]
Shimizu et al.

[11] Patent Number: 5,745,186
[45] Date of Patent: Apr. 28, 1998

[54] VIDEO SIGNAL PROCESSING CIRCUIT FOR REDUCING A VIDEO SIGNAL

[75] Inventors: Yutaka Shimizu, Ora-gun; Mitoku Kamei, Isesaki, both of Japan

[73] Assignee: Sanyo Electric Co., Ltd., Osaka, Japan

[21] Appl. No.: 649,158

[22] Filed: May 17, 1996

[30] Foreign Application Priority Data

May 19, 1995 [JP] Japan .................................... 7-121391

[51] Int. Cl.$^6$ ...................................................... H04N 9/74
[52] U.S. Cl. ................................................ 348/562; 348/582
[58] Field of Search ................................. 348/561, 562, 348/564, 565, 566, 567, 568, 581, 582, 642, 659, 666, 704, 706, 716, 717; H04N 5/44, 9/74

[56] References Cited

U.S. PATENT DOCUMENTS 5,043,811  8/1991  Yasuhiro ............................ 348/565
5,420,643  5/1995  Romesburg et al. ............... 348/704
5,668,604  9/1997  Takano et al. ...................... 348/582

*Primary Examiner*—Bryan S. Tung
*Attorney, Agent, or Firm*—Loeb & Loeb LLP

[57] ABSTRACT

A 4:4:4 component video signal comprising a luminance signal Y and color-difference signals Cb and Cr is transformed to a 4:1:1 component coded video signal coded by a coding device, reducing processing is carried out after transformation and the result is written into the frame memory based on an enable signal. At this point, the pulse number of the enable signal ENy of the reduced luminance signal is counted, the differential between the horizontal pixel number when the reduced color-difference signals are decoded to the original 4:4:4 component video signal and the horizontal pixel number of the reduced luminance signal is determined, a dummy pulse of this differential is generated and the dummy pulse portion only of the writing address of the frame memory for the reduced luminance signal is shifted backwards. Reduced signals read out from the frame memory are outputted after being decoded to the original 4:4:4 component video signal by the decoding device.

18 Claims, 3 Drawing Sheets

VIDEO SIGNAL PROCESSING CIRCUIT FOR REDUCING A VIDEO SIGNAL

BACKGROUND OF THE INVENTION

1. Field of the Invention

The present invention relates to a video signal processing circuit for reducing a video signal and displaying it on a television screen or a display screen as a small size scene.

2. Description of the Prior Art

Apparatuses have previously been produced for displaying video signals on a television screen which have a picture-in-picture function wherein video signals are reduced and window-displayed, and in such apparatuses the reducing rate of the video signal which is window-displayed has been fixed. However, with recent advances in multi media there have been increasing requirements for processing wherein a plurality of video signals are reduced at a given reducing rate and window-displayed on a television screen.

In previous cases where this type of reducing has been carried out, a 4:4:4 component video signal in which the resolution of all the signals are identical has normally been used as the video signal, for instance R, G, B, or a luminance signal Y, a chrominance signal (i.e., color-difference signal) Cb (B-Y), and a chrominance signal (i.e., color-difference signal) Cr (R-Y).

When reducing is carried out using a 4:4:4 component video signal, there is a problem in that a large-scale circuit is required. However, by utilizing the characteristic that, in general, the human eye is not especially sensitive to chrominance signals, it is envisaged that the scale of the circuit can be reduced by decreasing the chrominance signals by one half or one quarter, thus substituting the 4:4:4 component video signal with a 4:2:2 component coded video signal or a 4:1:1 component coded video signal and by then reducing only this coded video signal.

However, after reducing a component coded video signal, for instance a 4:2:2 component coded video signal or a 4:1:1 component coded video signal, the image must be decoded to the original 4:4:4 component video signal for display. When this is done, due to the reducing rate, a difference occurs between the horizontal pixel number of the decoded luminance signal and the horizontal pixel number of the decoded chrominance signals, resulting in a problem of chrominance displacement being generated in the display image.

For instance, in a case in which the horizontal pixel number of a 4:4:4 component video signal is "404", with a 4:1:1 component coded video signal, since the resolution of the chrominance signals is at quarter value, the horizontal pixel number of the chrominance signals will be "101". If reducing is here carried out at half the reducing rate, the horizontal pixel number of the luminance signal will be "202" and the horizontal pixel number of the chrominance signals will be "51". When this reduced signal is then decoded to a 4:4:4 component video signal, the luminance signal remains at "202" but the chrominance signals become "204", and consequently a differential of "2" occurs between the horizontal pixel numbers of the luminance signal and the chrominance signals. When displayed in this state, a chrominance displacement occurs in accordance with the difference in the pixel numbers.

SUMMARY OF THE INVENTION

It is the object of the present invention to decrease the circuit scale of a video signal processing circuit, while at the same time, in cases where the reducing of a video signal is carried out, to prevent display image chrominance displacement from being generated by displacement in the pixel numbers of a luminance signal and a chrominance signal.

In order to achieve the above objectives, a video signal processing circuit of the present invention is characterized as follows.

A first aspect is a video signal processing circuit, for processing a video signal including a luminance signal and a chrominance signal, comprising a coding device for coding an input video signal, including a luminance signal and a chrominance signal, to a signal with a reduced resolution chrominance signal;

a reducing circuit for reducing to a luminance signal and a chrominance signal which have been coded by the coding device, and outputting a reduced luminance signal and a reduced chrominance signal;

frame memories for respectively storing the reduced luminance signal and the reduced chrominance signal obtained from the reducing circuit;

a reading control circuit for controlling the reading of the reduced luminance signal and the reduced chrominance signal from the frame memories;

a decoding device, to which is inputted read out reduced luminance and reduced chrominance signal, for decoding the reduced luminance signal and the reduced chrominance signal to a signal having a resolution equal to that of the chrominance signal inputted to the coding device; and a correcting circuit, having a discriminating circuit for discriminating a pixel number differential between a horizontal pixel number when the reduced chrominance signal is decoded and a horizontal pixel number of the reduced luminance signal, for correcting a write address to a frame memory by only the pixel number of the discriminated pixel number differential.

In a video signal processing circuit of the present invention having such characteristics, the coding device carries out "coding" processing to an input luminance signal and an inputted chrominance signal wherein the resolution for the chrominance signal is reduced. The reducing circuit(s) then reduces these coded signals. The reduced luminance signal and the reduced chrominance signal are stored in their respective frame memories and a discriminating circuit discriminates the pixel number differential between the horizontal pixel number when the reduced coded chrominance signal has been decoded to its original resolution by a decoding device and the horizontal pixel number of the decoded reduced luminance signal. The correcting circuit corrects only the pixel number differential of the write address for the reduced luminance signal to the memory. After decoding, these horizontal pixel numbers of the reduced luminance signal and the reduced chrominance signal are controlled to ensure that they are equal, and when the reduced screen is displayed on a display or the like, chrominance displacement in the display image is effectively prevented.

In the configuration described above, the frame memory writes the reduced luminance signal in response to a write enable signal, and the correcting circuit additionally supplies the write enable signal only for a number of pixels corresponding to the discriminated pixel number differential.

In the configuration described above, the reducing circuit outputs the write enable signals of a pulse train displaying the respective valid periods of the reduced luminance signal and the reduced chrominance signal;

the correcting circuit has a dummy pulse generating circuit, the discriminating circuit discriminates the pixel number differential by counting the pulse of the write enable signal corresponding to the reduced luminance signal, and the dummy pulse generating circuit adds a dummy pulse equivalent to the discriminated pixel number differential to the write enable signal corresponding to the reduced luminance signal.

In the configuration described above, the reading control circuit controls a reading period of the reduced luminance signal and the reduced chrominance signal based upon the horizontal pixel number of the reduced luminance signal during 1 horizontal period and the pixel number differential between the horizontal pixel number when the reduced chrominance signal is decoded and the horizontal pixel number of the reduced luminance signal.

In the configuration described above, the discriminating circuit outputs as a signal for displaying a pixel differential a 2's complement of the residual when the horizontal pixel number of the reduced luminance signal has been divided by a designated value corresponding to a reduced resolution rate for the chrominance signal at the coding device.

In the configuration described above, the discriminating circuit outputs, as a signal for displaying a pixel differential, a 2's complement of the residual when the horizontal pixel number of the reduced luminance signal has been divided by a designated value corresponding to a reduced resolution rate for the chrominance signal at the coding device.

In another example of the abovementioned discriminating circuit, the discriminating circuit includes a counter for sequentially counting the horizontal pixel number of the reduced luminance signal, and outputs, as a signal for displaying the pixel differential, an output signal from a designated bit position of the counter which corresponds to a reduced resolution rate for the chrominance signal at the decoding device.

In a further example of the abovementioned discriminating circuit, the discriminating circuit includes a counter for sequentially counting the horizontal pixel number of the reduced luminance signal, and outputs, as a signal for displaying the pixel differential, a complement output signal obtained by calculating a 2's complement from an output signal from a designated bit position of the counter which corresponds to a reduced resolution rate for the chrominance signal at the decoding device.

In the configuration described above, the reading control circuit controls a reading period of the reduced luminance signal and the reduced chrominance signal based upon the horizontal pixel number of the reduced luminance signal during 1 horizontal period and the pixel number differential between the horizontal pixel number when the reduced chrominance signal is decoded and the horizontal pixel number of the reduced luminance signal.

Moreover, the abovementioned discriminating circuit includes a counter for counting the horizontal pixel number of the reduced luminance signal and the pixel number differential between the horizontal pixel number when the reduced chrominance signal is decoded and the horizontal pixel number of the reduced luminance signal, and outputs as a signal for displaying the pixel number differential, an output signal from a designated bit position of the counter after counting the horizontal pixel number of the luminance signal and which corresponds to a reduced resolution rate for the chrominance signal at the decoding device;

the reading control circuit controls a reading period of the reduced luminance signal and the reduced chrominance signal based upon a complement output signal obtained by calculating a 2's complement from an output signal of the counter.

In a further example of the abovementioned discriminating circuit, the discriminating circuit includes a counter for counting the horizontal pixel number of the reduced luminance signal and the pixel number differential between the horizontal pixel number when the reduced chrominance signal is decoded and the horizontal pixel number of the reduced luminance signal, and outputs, as a signal for displaying the pixel number differential, a complement output signal obtained by calculating a 2's complement from an output signal from a designated bit position of the counter after counting the horizontal pixel number of the reduced luminance signal and which corresponds to a reduced resolution rate for the chrominance signal at the decoding device;

the reading control circuit controls a reading period of the reduced luminance signal and the reduced chrominance signal based upon the output signal from a designated bit position of the counter.

In addition to the abovementioned configuration, the video signal processing circuit is characterized in that it also has a window frame adding circuit for adding a window frame signal in order to partition the display range of a reduced luminance signal and a reduced chrominance signal obtained after being decoded by the decoding circuit.

The window frame adding circuit is characterized in that it adds a window frame signal having a width greater than the maximum pixel number differential discriminated by the correcting circuit.

Thus, by adding a window frame signal with a width greater than the maximum pixel number differential, the reduced luminance signal forcibly added in response to the abovementioned pixel number differential by the correcting circuit is prevented from being displayed on the screen. In particular, in a case where a reduced luminance signal added in response to a pixel number differential is created by using, for instance, the reduced luminance signal on the next horizontal line, it is possible, by employing a configuration which adds a window frame signal in the way described above, to effectively prevent the display of inappropriate luminance signals and to maintain the quality of the display.

DESCRIPTION OF THE PREFERRED EMBODIMENTS

Embodiment 1

Figure 1:
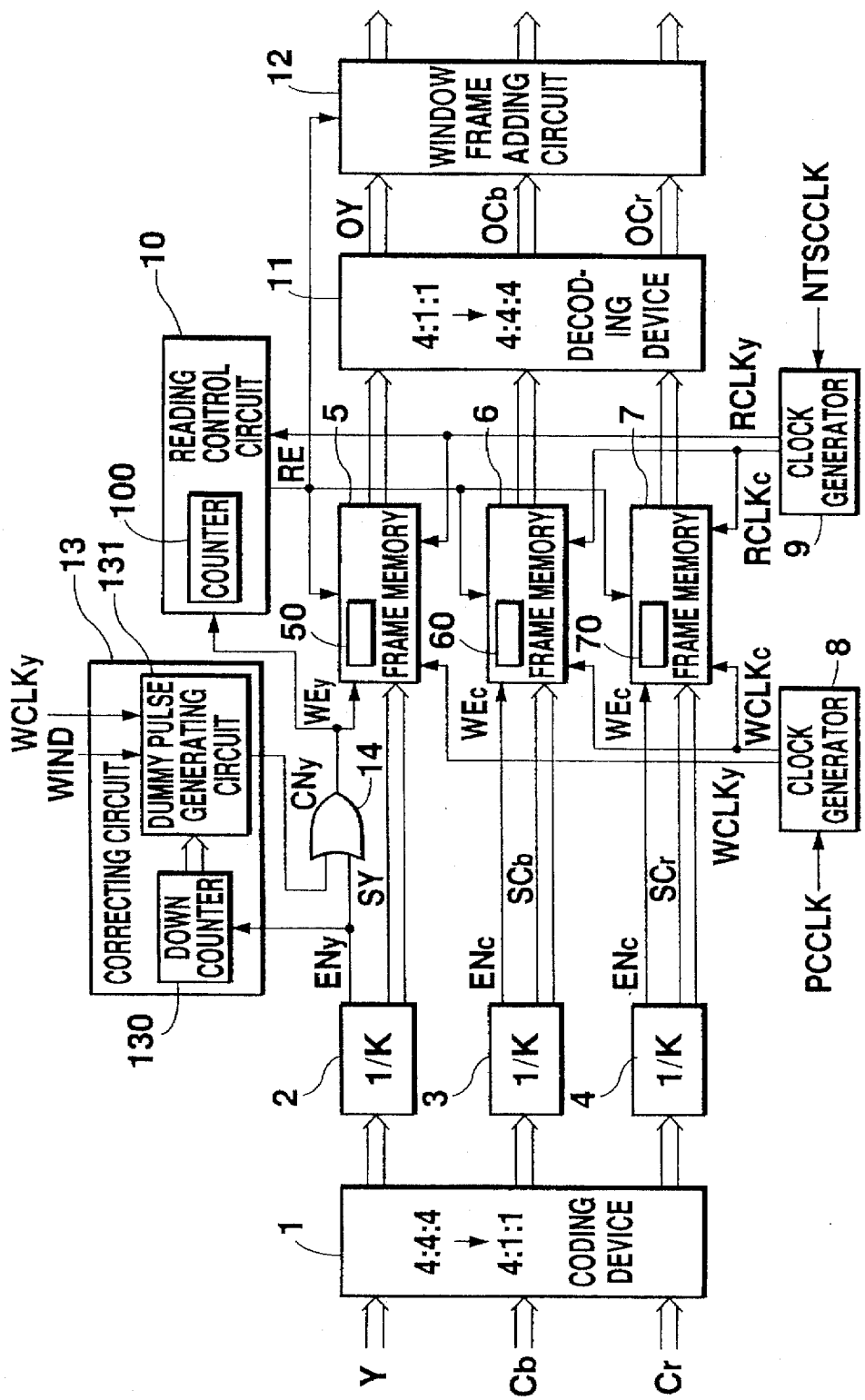
FIG. 1 is a block diagram showing a configuration in a first embodiment of the invention.

FIG. 1 is a block diagram showing a configuration of the present invention in this embodiment, in which a 4:4:4 component video signal comprising a luminance signal Y and color-difference signals Cb and Cr as chrominance signals is input and substituted by the coding device 1 in FIG. 1 with a 4:1:1 component coded video signal after carrying out down-sampling on the color-difference signals Cb and Cr. Reducing circuits 2, 3 and 4 reduce to the substituted 4:1:1 component coded video signal at a given reducing rate 1/k, and while outputting a reduced luminance signal SY, a reduced color-difference signal SCb and a reduced color-difference signal SCr, also output enable signals ENy, ENc and ENc showing the valid period of each signal.

The reducing effected in these reducing circuits 2, 3 and 4 can simply be thinned out; or alternatively, filter processing from a plurality of pixels lined up horizontally is acceptable, for instance medium extraction, maximum value extraction or minimum value extraction filter processing; or alternatively, since the horizontal resolutions of the color-difference signals are reduced to ¼ of their original values, the reducing circuits 3 and 4 for the color-difference signals may operate with a ¼ clock frequency of the reducing circuit 2 for the luminance signal.

Frame memories 5, 6 and 7 receive the enable signals ENy, ENc and ENc output from the reducing circuit as write enable signals WEy and WEc, and while these write enable signals WEy and WEc are at the H level, the frame memories write out each reduced luminance signal SY, reduced color-difference signal SCb and reduced color-difference signal SCr in response to clock signals WCLKy and WCLKc generated from a clock generator 8. A reading control circuit 10 is a controlling circuit for generating a read enable signal RE to indicate the reading periods from frame memories 5, 6, and 7. Then, while this read enable signal RE is at the H level, a reduced luminance signal SY, a reduced color-difference signal SCb and a reduced color-difference signal SCr are all read out from the frame memories 5, 6, and 7 in response to clock signals RCLKy and RCLKc generated from a clock generator 9. Write address counters 50, 60, 70 are installed at each of these frame memories 5, 6, 7, and these write address counters 50, 60, 70 count each of the clock signals for writing WCLKy, WCLKc, WCLKc applied by the clock generator 8 while the write enable signal WE is at the H level.

The clock generators 8 and 9 are for outputting clock signals for writing and reading based on a personal computer pixel clock signal PCCLK and a television NTSC-system pixel clock signal NTSCCLK, and the clock signals WCLKc and RCLKc are set to clock frequencies at ¼ of the clock signals WCLKy and WCLKc.

Moreover, a decoding device 11 decodes the 4:1:1 component coded video signal read out from the frame memories 5, 6, 7 to a 4:4:4 component video signal OY, OCb, OCr having the same resolution as the original; and prior to output, a window frame adding circuit 12 adds a window frame signal showing a window frame to the 4:4:4 component video signal which has been decoded.

In addition, in the present embodiment, a correcting circuit 13 is provided which includes a 2-bit down counter 130 for counting the enable signal ENy for the luminance signal, and a dummy pulse generating circuit 131 for generating a dummy pulse CNy corresponding to the count result of the down counter 130. The dummy pulse CNy generated by the dummy pulse generating circuit 131 and the enable signal ENy supplied by the reducing circuit 2 are supplied through an OR gate 14 to a frame memory 15 as a write enable signal WEy.

This write enable signal WEy is also supplied to a reading control circuit 10 and counted by an internal counter 100 such that, at a period which corresponds to the count result of the counter 100, the reading control circuit 10 changes the read enable signal RE to the H level in response to a clock signal RCLKy from the clock generator 9.

The operation of this embodiment will now be described with reference to the timing chart depicted in FIG. 2.

Figure 2:
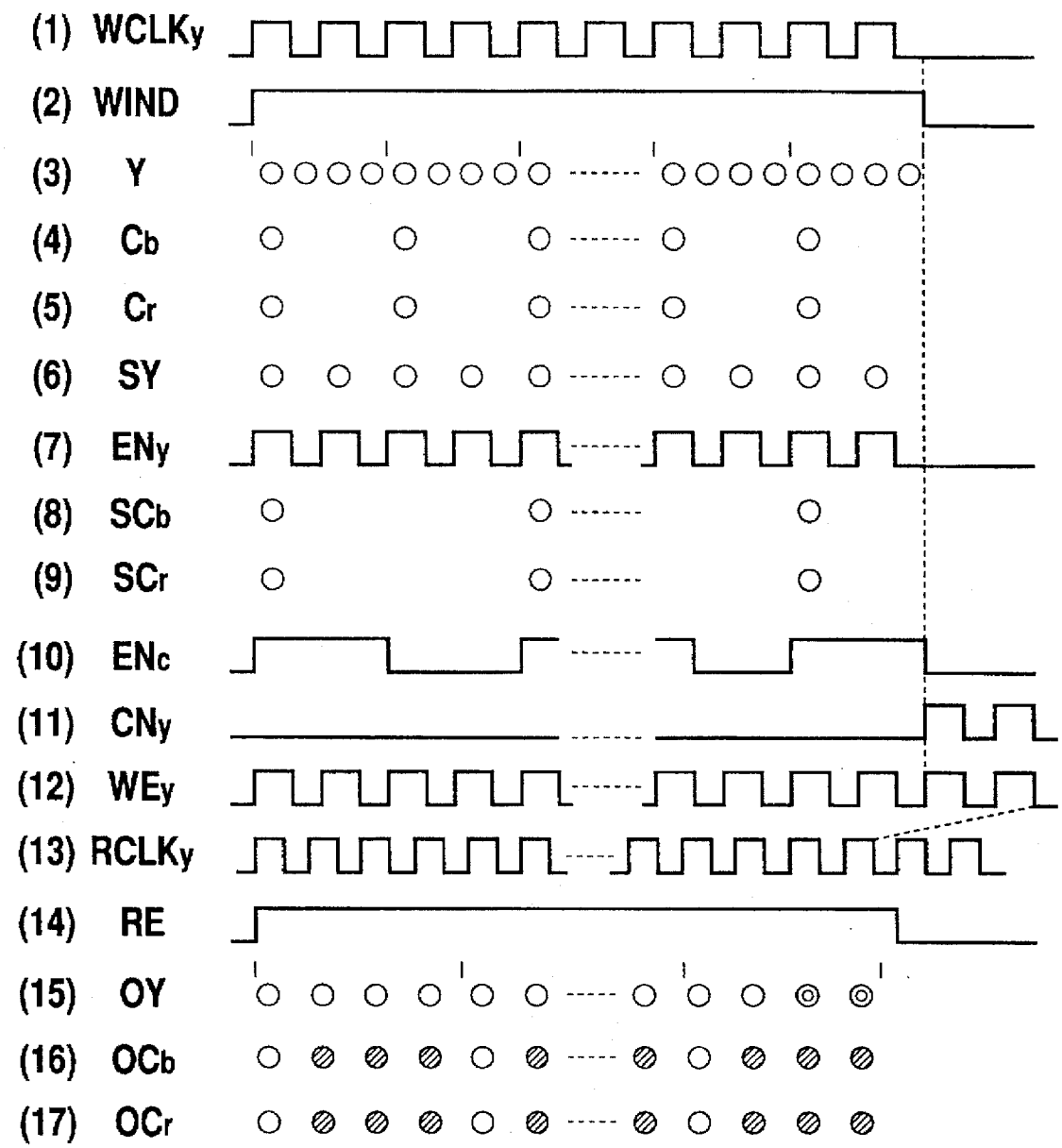
FIG. 2 is a timing chart showing the operation of the first embodiment.

If the horizontal pixel number of the input 4:4:4 component video signal was "404" as shown here at (3) in FIG. 2, then the resolution of the color-difference signals Cb and Cr of the 4:1:1 component video signal coded at the coding device 1 is ¼ and the horizontal pixel number is "101" as shown at (3), (4) and (5) in FIG. 2. Moreover, the horizontal pixel number of the luminance signal Y is "404" as originally.

If reducing to ½ is now carried out by the reducing circuits 2, 3, 4, as shown at (6) in FIG. 2 the horizontal pixel number of the reduced luminance signal SY is "202", and as (7) in FIG. 2 shows, a signal alternately repeating the H level and the L level for each individual pixel is output by the reducing circuit in FIG. 1 as an enable signal ENy. In addition, as shown at (8) and (9) in FIG. 2, as in the case of the horizontal pixel numbers at the reducing circuits 3 and 4, the reduced color-difference signals Cb and Cr decrease by approximately ½ to "51", and an enable signal ENc with a frequency ¼ that of the enable signal ENy is output in the manner shown at (10) in FIG. 2.

At the frame memories 6 and 7 the internal write address counters 60 and 70 count the clock signals WCLKc while the enable signal ENc shown at (10) in FIG. 2 is at the H level and update the write address, so that the reduced color-difference signals SCb and SCr (FIG. 2 (8), (9)) for the frame memories 6 and 7 are sequentially written out. Similarly, the internal counter 50 of the frame memory 5 for the luminance signal counts the clock signal WCLKy while the enable signal ENy shown at (7) in FIG. 2 is at the H level and updates the write address, so that the reduced luminance signal SY, shown at (6) in FIG. 2, for the frame memory 5 is sequentially written out.

The 2-bit down counter 130 of the correcting circuit 13 is set at an initial value of "00" and is configured to count the luminance signal enable signal ENy shown at (7) in FIG. 2 when a window signal WIND ((2) in FIG. 2) for showing 1 horizontal period is at the H level. Consequently, this counter 130 sequentially repeats "0", "3", "2", "1". Thus when the window signal WIND has reached the L level, the count result of the counter 130 is a 2's complement for the residual when the horizontal pixel number of the reduced luminance signal SY in 1 horizontal period is divided by 4.

Since the horizontal pixel numbers of the reduced color-difference signals SCb and SCr (FIG. 2 (8), (9)) are scaled-up by 4 times by the latter stage decoding device 11, the value of the count result of the counter 130 when the window signal WIND (FIG. 2 (2)) has reached the L level thus shows the difference between the horizontal pixel numbers of the reduced color-difference signals SCb and SCr which have been decoded by the decoding device 11 and the horizontal pixel number of the reduced luminance signal SY.

A number of dummy pulses CNy (FIG. 2 (11)) corresponding to this difference are output from the dummy pulse generating circuit 131 and input through the OR gate 14 to the frame memory 5 as a write enable signal WEy, and since the address counter 50 of the frame memory 5 also counts these dummy pulses, only the write address for the dummy pulses is updated from the write address which had been updated in accordance with the enable signal ENy while the signal WIND was at the H level. In the case of this embodiment, since the horizontal pixel number of the reduced luminance signal SY (FIG. 2 (6)) is "202," at the point where a "200" pulse enable signal ENy (FIG. 2 (7)) is input to the counter, the value of the counter 130 returns to "00" and by subsequently inputting a 2-pulse enable signal ENy the value of the counter 130 changes in the sequence "3", "2" and counting terminates in this state. Therefore as shown in FIG. 2 (11), a dummy pulse of 2 CNy is thus output from the dummy pulse generating circuit 131 and input to the frame memory 5 through the OR gate 14 as shown in FIG. 2 (12).

As a result, at the frame memory 5 only 2 further addresses are updated, the address counter 50 changes from "202" to "204" and the updating of addresses terminates in this state. In other words, in 1 horizontal period, address updating is carried out without fail every 4 multiples, therefore the horizontal pixel numbers of the reduced luminance signal and the reduced color-difference signals which were decoded in the decoding device 11 definitely coincide.

Since the counter 100 within the reading control circuit 10 counts the output of the OR gate 14, the value of that counter is thus the sum value of the enable signal ENy (FIG. 2 (7)) and the dummy pulse CNy (FIG. 2 (11)). In order to read out the data for this count number only from the frame memory 50 in a designated period as shown in FIG. 2 (14) the reading control circuit 10 sets the read enable signal RE to the H level, and during the period that this RE signal is at the H level all the reduced signals are read out from the frame memories 5, 6, and 7. Consequently, the reduced luminance signal SY with a corrected pixel number is read out from frame memory 5 and the reduced color-difference signals Cb and Cr with pixel numbers of ¼ of the corrected pixel numbers are read out from frame memories 6 and 7.

In this way, the 4:1:1 component coded video signal replaces the original 4:4:4 component video signals OY, OCb and OCr by the decoding device as shown in FIG. 2 (15), (16), (17). The double circle symbol in FIG. 2 (15) is a luminance signal created based on the abovementioned 2 dummy pulses, and the single circle symbol shaded with diagonal lines in FIG. 2 (16), (17) shows the color-difference signals Cb, Cr obtained after resolution restoration processing (i.e., decoding processing) has been carried out at the decoding device 11. A window frame is added to the edge portion of the window-displaying by the window frame adding circuit 12 prior to outputting. In this example, the width of the window frame is set at 3 pixels and the 3 pixels at the edge portion are not displayed in the window. In this embodiment, since the difference between the horizontal pixel number when the reduced color-difference signals SCb and SCr have been decoded by the decoding device 11 and the horizontal pixel number of the reduced luminance signal SY is a maximum of 3 pixels, even when a difference of 3 pixels is produced, the width of the window frame is set at 3 in accordance with the maximum pixel number difference value in order to ensure that the reduced luminance signal which has been additionally written in the frame memory 5 by the dummy pulse is not displayed.

Embodiment 2

A second embodiment will now be explained with reference to FIG. 3.

In the first embodiment described above a counter 130 for generating a dummy pulse and a counter 100 for generating a read enable signal RE were configured in separate circuits, but in the following configuration a single performs the functions of these counters.

Figure 3:
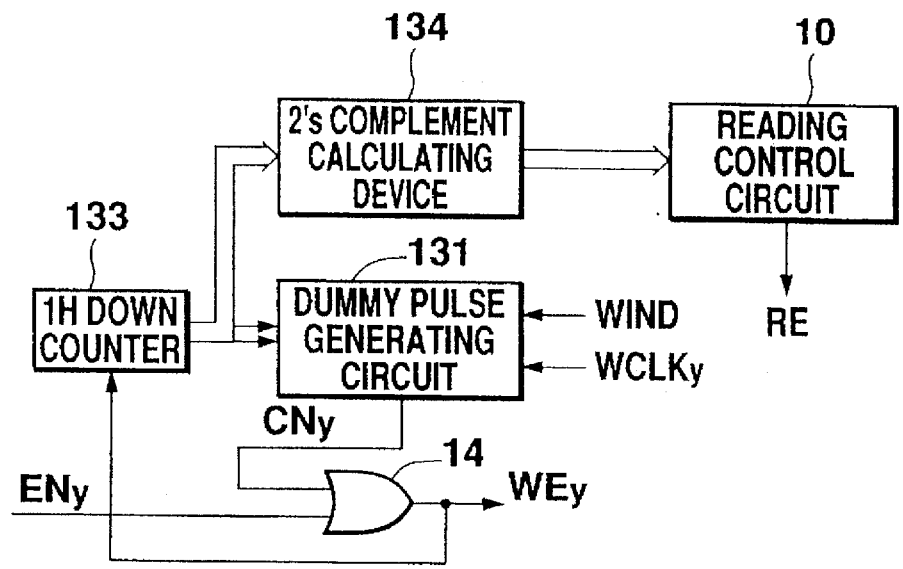
FIG. 3 is a block diagram showing the essential portions of a second embodiment.

In FIG. 3, a counter of a correcting circuit 130, to which is inputted a write enable signal WEy outputted from an OR gate, comprises a 1 H down counter 133 with a bit number so as to obtain, as the count result, the total pulse number of an enable signal ENy of 1 horizontal period and a subsequently outputted dummy pulse CNy. In the example described above, since the corrected horizontal pixel number is "204" an 8-bit counter is acceptable as the 1 H down counter 133.

The initial value of this 1 H down counter 133 is set to 0 and each time the write enable signal WEy is counted the count value descends in a sequence "11111111", "11111110", but while the signal WIND is at the H level the lowest 2 bits operate in exactly the same way as the counter 130 in FIG. 1. Therefore, if the lowest 2 bits of this 1 H counter 133 are inputted to a dummy pulse generating circuit 131, a dummy pulse equivalent to the difference in the horizontal pixel numbers can be outputted as in the previous embodiment.

Since a down counter is used as the 1 H counter in this embodiment, if a 2's complement number for the count result of the 1 H counter is calculated at a 2's complement calculating circuit 134, the calculated value will be the total pulse number of the enable signal ENy of 1 horizontal period and the subsequently outputted dummy pulse CNy, and thus if this value is supplied to a reading control circuit 10 the counter in FIG. 1 can be omitted.

Embodiment 3

Figure 4:
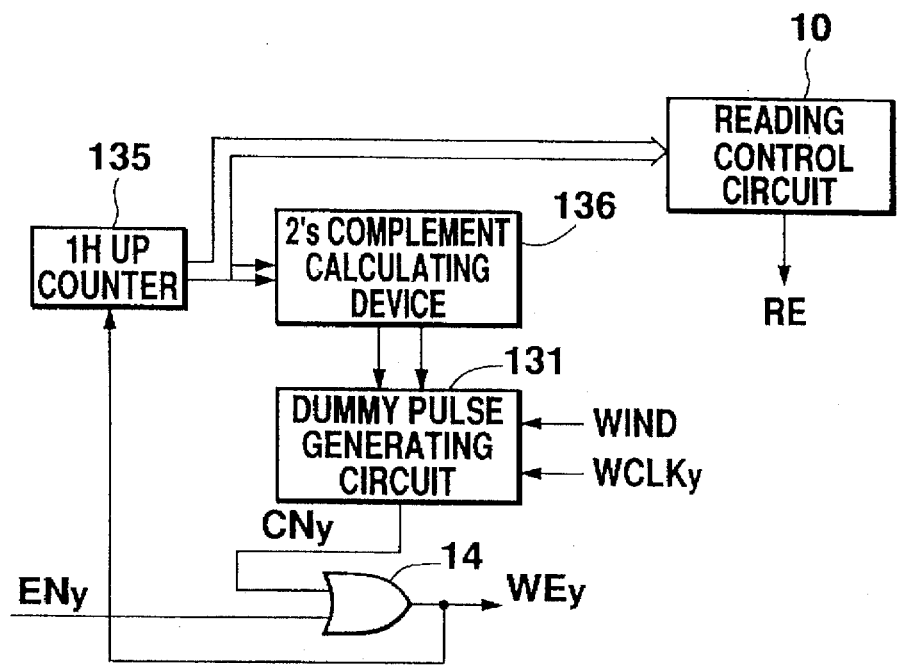
FIG. 4 is a block diagram showing the essential portions of a third embodiment.

The embodiment shown in FIG. 4 is an example in which the down counter 133 of the second embodiment has been replaced by an up counter 135, and as in the second embodiment a single counter is being used for the two counters 130 and 100 shown in FIG. 1. If the initial value of the up counter of the present embodiment is set at 0, for the lowest 2 bits of the 1 H up counter the residual when the pulse number of the enable signal ENy is divided by 4 is obtained as the count result of 1 horizontal period in which the signal WIND is at the H level. With regard to the value of these 2 bits, if a 2's complement is obtained in the 2's complement calculating circuit 136, a value equivalent to the difference in the horizontal pixel numbers is obtained, and if this value is inputted to the dummy pulse generating circuit 131, a dummy pulse equivalent to this difference can be outputted, as in the previous embodiment. In this example, since the total pulse number of the enable signal ENy of 1 horizontal period and the subsequently outputted dummy pulse CNy is obtained at the 1 H up counter 135, if this value is supplied as it is to the reading control circuit 10, the counter in FIG. 1 can be omitted.

The embodiments 1, 2, and 3 described above show examples in which a 4:1:1 component coded video signal was used, but when a 4:2:2 component coded video signal is used, the bit number of the counter 130 in FIG. 1 (embodiment 1) is set at 1 and each time an enable signal EN is counted the counter may alternate between "1" and "0", or alternatively in FIG. 3 (embodiment 2) and FIG. 4 (embodiment 3) only the lowest bit of the 1 H counters 133 and 135 may be inputted to the dummy pulse generating circuit 131 or to the 2's complement calculating circuit 136.

In a case in which this 4:2:2 component coded video signal is used, a 2's complement of the residual when the horizontal pixel number of the reduced luminance signal SY has been divided by 2 is outputted to the dummy pulse generating circuit 131. However, since in real terms this 2's complement is to be the same value as the residual when the horizontal pixel number of the reduced luminance signal SY has been divided by 2, it is possible to omit the 2's complement circuit shown in FIG. 4.

According to each of the embodiments of the present invention described above, by using a coding device which has lowered the resolution of the chrominance signals the scale of the circuit can be reduced, and chrominance displacement due to differences in horizontal pixel numbers can be prevented.

While there have been described what are at present considered to be preferred embodiments of the invention, it will be understood that various modifications may be made to the present invention and it is intended that the appended claims cover all such modifications as fall within the true spirit and scope of the invention.

What is claimed is:

1. A video signal processing circuit comprising:

a coding device for coding an inputted video signal, including a luminance signal and a chrominance signal, to a signal with a reduced resolution chrominance signal;

a reducing circuit for carrying out reduction processing on a luminance signal and a chrominance signal which have been coded by the coding device, and outputting a reduced luminance signal and a reduced chrominance signal;

frame memories for respectively storing the reduced luminance signal and the reduced chrominance signal obtained by the reducing processing;

a reading control circuit for controlling the reading of the reduced luminance signal and the reduced chrominance signal from the frame memories;

a decoding device, to which is inputted read out reduced luminance and reduced chrominance signals, for decoding the reduced luminance signal and the reduced chrominance signal to a signal having a resolution equal to that of the chrominance signal inputted to the coding device;

a correcting circuit, having a discriminating circuit for discriminating a pixel number differential between a horizontal pixel number when the reduced chrominance signal is decoded and a horizontal pixel number of the reduced luminance signal, for correcting a write address to a frame memory by only the pixel number of the discriminated pixel number differential.

2. A video signal processing circuit according to claim 1, wherein
   the frame memory writes the reduced luminance signal in response to a write enable signal, and the correcting circuit additionally supplies the write enable signal only for a number of pixels corresponding to the discriminated pixel number differential.

3. A video signal processing circuit according to claim 2, wherein
   the reducing circuit outputs the write enable signals of a pulse train respectively displaying the valid periods of the reduced luminance signal and the reduced chrominance signal;
   the correcting circuit has a dummy pulse generating circuit, the discriminating circuit discriminates the pixel number differential by counting the pulse of the write enable signal corresponding to the reduced luminance signal, and the dummy pulse generating circuit adds a dummy pulse equivalent to the discriminated pixel number differential to the write enable signal corresponding to the reduced luminance signal.

4. A video signal processing circuit according to claim 1, wherein
   the reading control circuit controls a reading period of the reduced luminance signal and the reduced chrominance signal based upon the horizontal pixel number of the reduced luminance signal during 1 horizontal period and the pixel number differential between the horizontal pixel number when the reduced chrominance signal is decoded and the horizontal pixel number of the reduced luminance signal.

5. A video signal processing circuit according to claim 4, wherein
   the frame memory writes the reduced luminance signal in response to a write enable signal, and the correcting circuit additionally supplies the write enable signal only for a number of pixels corresponding to the discriminated pixel number differential.

6. A video signal processing circuit according to claim 1, wherein
   the discriminating circuit outputs, as a signal for displaying a pixel differential, a 2's complement of the residual when the horizontal pixel number of the reduced luminance signal has been divided by a designated value corresponding to a reduced resolution rate for the chrominance signal at the coding device.

7. A video signal processing circuit according to claim 1, wherein
   the discriminating circuit includes a counter for sequentially counting the horizontal pixel number of the reduced luminance signal, and
   outputs, as a signal for displaying the pixel differential, an output signal from a designated bit position of the counter which corresponds to a reduced resolution rate for the chrominance signal at the decoding device.

8. A video signal processing circuit according to claim 7, wherein
   the counter is a down counter.

9. A video signal processing circuit according to claim 1, wherein
   the discriminating circuit includes a counter for sequentially counting the horizontal pixel number of the reduced luminance signal, and
   outputs, as a signal for displaying the pixel differential, a complement output signal obtained by calculating a 2's complement from an output signal from a designated bit position of the counter which corresponds to a reduced resolution rate for the chrominance signal at the decoding device.

10. A video signal processing circuit according to claim 9, wherein
    the counter is an up counter.

11. A video signal processing circuit according to claim 1, wherein
    the reading control circuit controls a reading period based upon the horizontal pixel number of the reduced luminance signal during 1 horizontal period and the pixel number differential between the horizontal pixel number when the reduced chrominance signal is decoded and the horizontal pixel number of the reduced luminance signal.

12. A video signal processing circuit according to claim 11, wherein
    the reading control circuit includes a counter for counting the horizontal pixel number of the reduced luminance signal during 1 horizontal period and the pixel number differential between the horizontal pixel number when the reduced chrominance signal is decoded and the horizontal pixel number of the reduced luminance signal, and controls the reading period based upon an output signal form the counter.

13. A video signal processing circuit according to claim 1, wherein the discriminating circuit includes a counter for counting the horizontal pixel number of the reduced luminance signal and the pixel number differential between the horizontal pixel number when the reduced chrominance signal is decoded and the horizontal pixel number of the reduced luminance signal, and outputs, as a signal for displaying the pixel number differential, an output signal from a designated bit position of the counter after counting the horizontal pixel number of the luminance signal and which corresponds to a reduced resolution rate for the chrominance signal at the decoding device; and the reading control circuit controls a read period of the reduced luminance signal and the reduced chrominance signal based upon a complement output signal obtained by calculating a 2's complement from an output signal of the counter.

14. A video signal processing circuit according to claim 13, wherein the counter is a down counter.

15. A video signal processing circuit according to claim 1, wherein the discriminating circuit includes a counter for counting the horizontal pixel number of the reduced luminance signal and the pixel number differential between the horizontal pixel number when the reduced chrominance signal is decoded and the horizontal pixel number of the reduced luminance signal, and outputs, as a signal for displaying the pixel number differential, a complement output signal obtained by calculating a 2's complement from an output signal from a designated bit position of the counter after counting the horizontal pixel number of the reduced luminance signal and which corresponds to a reduced resolution rate for the chrominance signal at the decoding device;

the reading control circuit controls a read period of the reduced luminance signal and the reduced chrominance signal based upon the output signal from a designated bit position of the counter.

16. A video signal processing circuit according to claim 15, wherein the counter is an up counter.

17. A video signal processing circuit according to claim 1, wherein the video signal processing circuit also has a window frame adding circuit for adding a window frame signal in order to partition a display range of a reduced chrominance signal and a reduced luminance signal obtained after being decoded by the decoding circuit.

18. A video signal processing circuit according to claim 17, wherein the window frame adding circuit adds a window frame signal having a width greater than the maximum pixel number differential discriminated at the correcting circuit.

* * * * *